United States Patent
Devallez et al.

(10) Patent No.: US 6,273,497 B1
(45) Date of Patent: *Aug. 14, 2001

(54) LOAD-CARRYING STRUCTURE, A SEGMENT OF BODY STRUCTURE, AND A VEHICLE BODY INCLUDING SUCH STRUCTURES

(75) Inventors: Alain Devallez, Escautpont; Vincent Simon, Beuvry la Foret, both of (FR)

(73) Assignee: GEC Alsthom Transport SA, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,755

(22) Filed: Apr. 16, 1998

(30) Foreign Application Priority Data

Apr. 17, 1997 (FR) .................................................. 97 04742

(51) Int. Cl.⁷ .................................................. B62D 31/02
(52) U.S. Cl. ...................................... 296/203.01; 296/178
(58) Field of Search .............................. 296/178, 203.01

(56) References Cited

U.S. PATENT DOCUMENTS

| | | | | |
|---|---|---|---|---|
| 1,588,906 | * | 6/1926 | Rackham | 296/178 |
| 1,673,786 | * | 6/1928 | Warhus | 296/178 |
| 1,737,547 | * | 12/1929 | Albright | 296/178 |
| 1,868,263 | * | 7/1932 | Weymann | 296/203.01 |
| 1,889,058 | * | 11/1932 | Daste | 296/203.01 |
| 2,849,254 | | 8/1958 | Dolk . | |
| 4,221,426 | * | 9/1980 | Wardill | 296/178 |
| 4,254,987 | * | 3/1981 | Leonardis | 296/178 |
| 4,283,086 | * | 8/1981 | Morin | 296/178 |
| 4,353,313 | * | 10/1982 | Panagin | 296/178 X |
| 4,678,226 | * | 7/1987 | Ishizuka et al. | 296/178 X |
| 4,773,701 | * | 9/1988 | Messorti | 296/178 |
| 4,852,936 | * | 8/1989 | Greene et al. | 296/178 |
| 5,056,848 | * | 10/1991 | Fekete et al. | 296/178 X |

FOREIGN PATENT DOCUMENTS

| | | |
|---|---|---|
| 647370 | 6/1937 | (DE) . |
| 726433 | 9/1942 | (DE) . |
| 0118116 | 9/1984 | (EP) . |
| 0498270A1 | 8/1992 | (EP) . |
| 660298 | 7/1929 | (FR) . |
| 1441664 | 5/1966 | (FR) . |
| 314685 | 7/1929 | (GB) . |

* cited by examiner

*Primary Examiner*—Joseph D. Pape
(74) *Attorney, Agent, or Firm*—Sughrue, Mion, Zinn, Macpeak & Seas, PLLC

(57) ABSTRACT

A load-carrying structure for a vehicle body, the structure extending radially to the longitudinal axis of the body and being suitable for being associated with structural elements parallel to the longitudinal axis of the body, the load-carrying structure constituting a flat frame member and including at least one flat strip, wherein the structural elements are suitable for being inserted in said frame member by a mechanism of notches for receiving them. The device also relates to a segment of body structure and to a vehicle body including such structures.

14 Claims, 3 Drawing Sheets

LOAD-CARRYING STRUCTURE, A SEGMENT OF BODY STRUCTURE, AND A VEHICLE BODY INCLUDING SUCH STRUCTURES

The present invention relates to body structures for road or rail vehicles in general, and relates more particularly to a load-carrying structure, to a segment of body structure, and to a vehicle body including such structures.

BACKGROUND OF THE INVENTION

Road or rail vehicle bodies are known in the state of the art.

Document GB 315 685 describes a vehicle framework comprising load-carrying structural elements (a, h, f, p, g) for a vehicle body extending radially to the longitudinal axis of the body and suitable for being associated with structural elements (d) parallel to said longitudinal axis of said body in which said load-carrying structural elements are constituted by at least one flat strip (a, h, f, p, g).

A drawback of that prior art framework is that the load-carrying structure does not make it possible to make non-plane faces in a simple manner.

Document CH 285 666 describes a traditional assembly of hollow section members, the window pier structure also being stiffened by hollow section members.

The embodiment defined is very little used, industrially speaking.

Documents EP 0 605 366 in the name of FIAT FERROVIARIA S.p.A. and EP 0 672 567 in the name of HITACHI LTD relate to a rail vehicle body obtained by assembling hollow section members.

A drawback of that technology is that it requires the hollow section members to have the same length as the vehicle.

Another drawback of that technology is that it is expensive.

Document U.S. Pat. No. 4,353,313 in the name of Centro Ricerche Fiat S.p.A. describes a body structure constituted by assembling together two half-roofs and a lower portion having the length of the body.

The structure extending between two window piers using plane strips that are curved on their edges for stiffening purposes.

A drawback of that technology is that it is complex to implement.

SUMMARY OF THE INVENTION

Thus, an object of the invention is to provide a vehicle body in which the load-carrying structure is lightened and simplified.

Another object of the invention is to provide a vehicle body in which the load-carrying structure makes it possible to provide faces that are not planar.

In other words, an object of the invention is to provide a load-carrying structure and a segment of body structure that can be implemented flexibly, thus making it possible to vary shapes and dimensions.

According to the invention, the load-carrying structure, the segment of body structure, and the vehicle body including such structures are as characterized below.

An advantage of the load-carrying structure, of the segment of body structure, and of the vehicle body including such structures of the invention is that they do not require hollow section members which oxidize and which establish thermal bridges.

Another advantage of the load-carrying structure, of the segment of body structure, and of the vehicle body including such structures of the invention is that it does not require extruded section members in its face, which members are expensive to make and heavy.

Another advantage of the load-carrying structure, of the segment of body structure, and of the vehicle body including such structures of the invention is that it shortens assembly time.

Another advantage of the load-carrying structure, of the segment of body structure, and of the vehicle body including such structures of the invention is that it decreases cost.

Another advantage of the load-carrying structure, of the segment of body structure, and of the vehicle body including such structures of the invention is a reduction in maintenance because there is less corrosion.

BRIEF DESCRIPTION OF THE DRAWINGS

Other objects, characteristics, and advantages of the invention appear on reading the following description of the preferred embodiment of the load-carrying structure, the segment of body structure, and the vehicle body including such structures, which description is made with reference to the drawings, in which.

DESCRIPTION OF THE PREFERRED EMBODIMENTS

Figure 1:
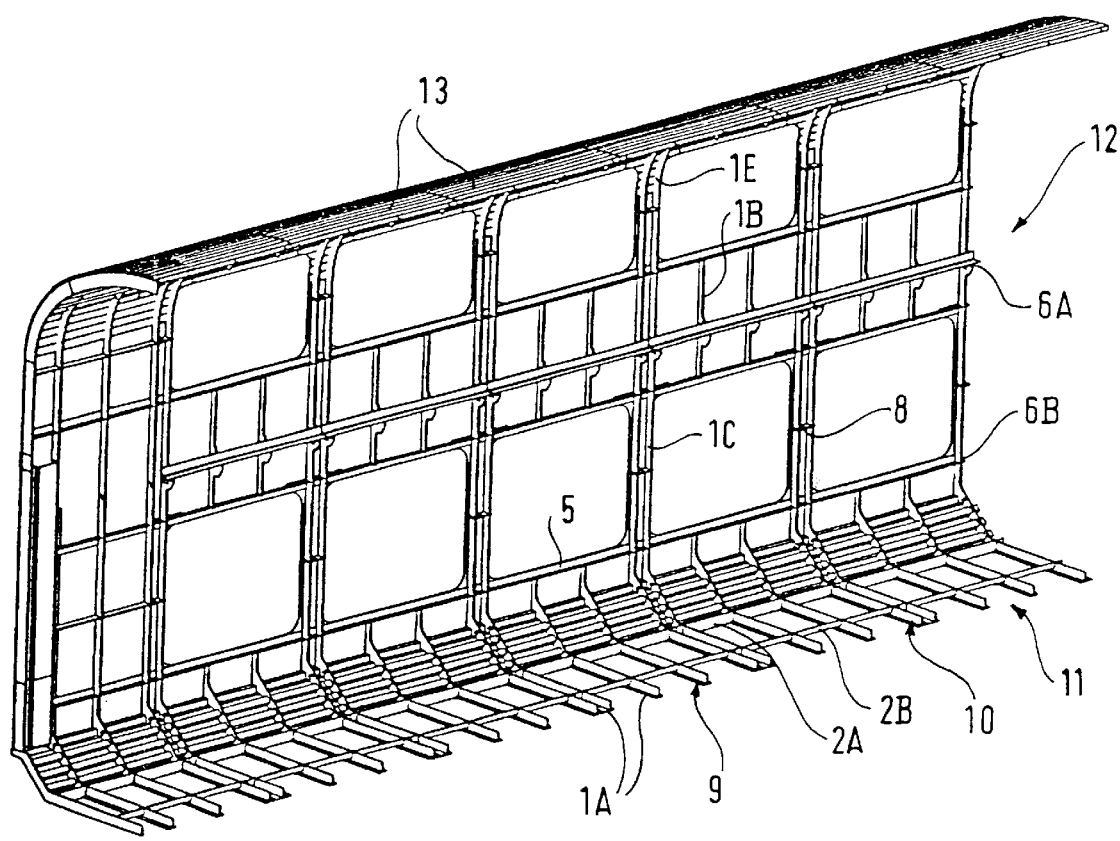
FIG. 1 is a fragmentary inside view of half a vehicle body of the invention.

FIG. 1 is a fragmentary inside view of half a vehicle body of the invention.

The vehicle body 12 of the invention includes at least one segment 11 of body structure on which there are applied at least two load-carrying longitudinal section members 5 parallel to the longitudinal axis of the body.

These two load-carrying longitudinal section members 5 contribute to providing longitudinal bending stiffness and they ensure that the structures are in alignment.

Covering sheets 13 are fitted to the segments 11 of body structure.

Figure 2:
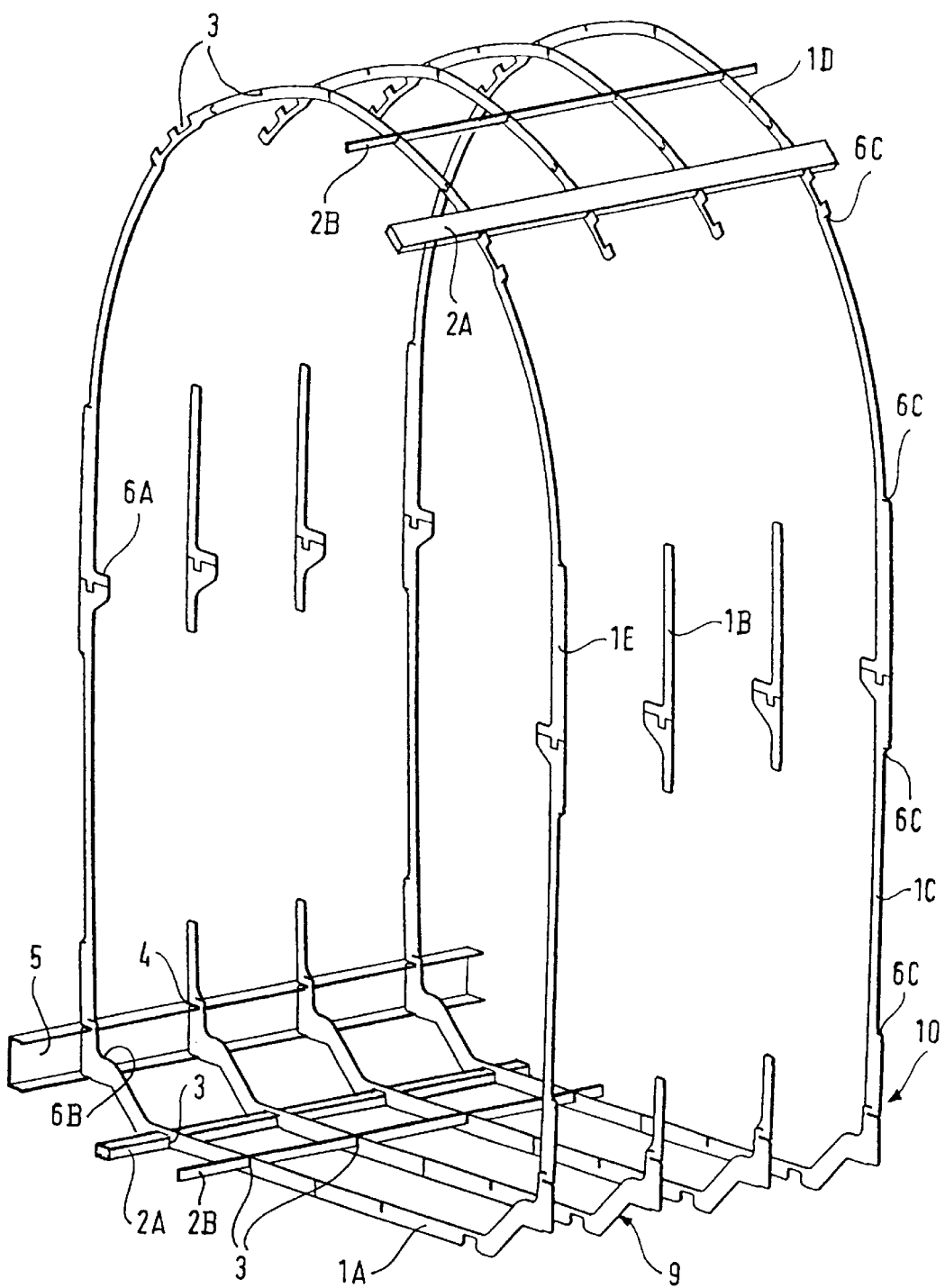
FIG. 2 is an exploded view of a segment of body structure used in the vehicle body of FIG. 1.

FIG. 2 is an exploded view of a segment of body structure used in the vehicle body of FIG. 1.

Each segment 11 of the vehicle body structure includes at least one load-carrying structure or frame member 9 in the form of a portion of a ring, and at least two load-carrying structures or frame members 10 in the form of rings.

These frame members 9 and 10 are associated with structural elements 2A and 2B extending parallel to the longitudinal axis of the body.

Each of the load-carrying structures 9 and 10 for the vehicle body includes at least one load-carrying structure element or flat strip 1A to 1E and forms at least a portion of a ring.

The frame members 9 forming a portion of a ring comprise respective assemblies of load-carrying structural elements or flat stamps 1A occupying a single plane.

The frame members 10 comprise at least first and second assemblies of load-carrying structural elements or flat 1A strips and 1C to 1E, each forming a ring, said rings being disposed, for example, one behind another and mutually in parallel.

The load-carrying structural elements 1A to 1E are preferably constituted by flat strips that are cut out as a function of the shape desired for the outside faces of the vehicle body.

The frame members 10 have linking flats 8 (FIG. 1) disposed perpendicularly between the section members 1A to 1E constituting the rings.

The flat strips 1A to 1E for a vehicle body are disposed radially to the longitudinal axis of the body and are suitable for being associated with structural elements 2A, 2B extending parallel to the longitudinal axis of the body.

Each of the load-carrying structural elements 1A to 1E is constituted by at least one flat strip.

The term "flat strip" is used herein to mean any element obtained by any method, e.g. rolling, extrusion, or laser cutting-out.

The flat strips 1A to 1E occupy a plane that is radial to the longitudinal axis of the body.

Some of the load-carrying structural elements or flat strips 1A to 1E include at least one notch 3 for receiving at least one of the structural elements 2A, 2B.

Some of the flat strips 1A to 1E include at least one notch 4 for receiving a longitudinal section member 5.

Some of the flat setrips 1A to 1E include at least one step 6A to 6D suitable for receiving an element of trim 7A to 7D.

By way of example, the trim elements 7A to 7D can be an intermediate floor 7A, a platform 7B, a window 7C, cabling 7D, or a seat.

The flat strips 1A to 1E are suitable for interfitting via at least one end with another load-carrying structural element.

Figure 3:
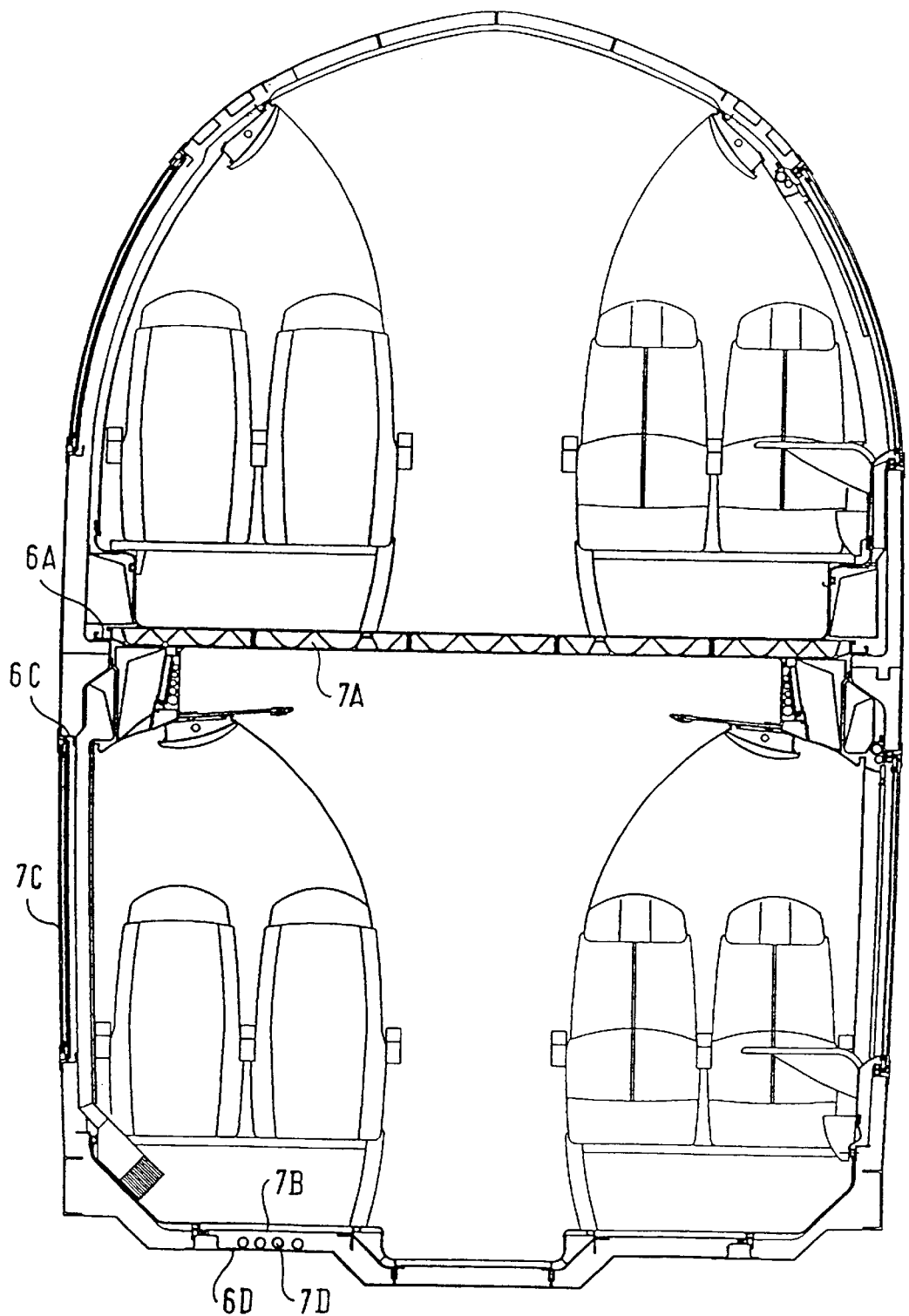
FIG. 3 is a cross-section view through a vehicle body of the invention.

FIG. 3 is a cross-section view through a vehicle body of the invention showing more particularly certain steps 6A to 6D and the corresponding trim elements 7A to 7D.

As can be seen from the above description, the frame members 10 for a vehicle body are radial to the longitudinal axis of the body and are suitable for being associated with structural elements 2A, 2B, and 5 extending parallel to the longitudinal axis of the body, and it includes at least one flat strip 1A to 1E.

The load-carrying structure or frame member constitutes a flat frame member in which the structural elements 2A, 2B, and 5 can be inserted by means of notches 3, 4 for receiving them.

It is clear that the frame members constitute either a complete ring, or else a ring that is incomplete.

What is claimed is:

1. A frame member adapted for use in a vehicle body, said frame member adapted to extend radially to a longitudinal axis of said body and adapted to associate with structural elements of said body parallel to said longitudinal axis of said body, said frame member comprising:
   a plurality of flat strips; and
   at least one notch;
   wherein at least one of said structural elements is adapted for insertion in said frame member by means of said at least one notch.

2. The frame member according to claim 1, further comprising at least one step adapted to receive an element of trim.

3. The frame member according to claim 2, wherein said element of trim is one of an intermediate floor, a platform, a window, cabling, and a seat.

4. The frame member according to claim 1, wherein at least one end of a first flat strip of said plurality of flat strips is adapted to engage with at least one end of a second flat strip of said plurality of flat strips of said frame member.

5. The frame member according to claim 1, wherein said frame member forms a complete ring.

6. The frame member according to claim 1, wherein said frame member forms an incomplete ring.

7. A vehicle body frame, comprising:
   a first frame member adapted for use in a vehicle body; and
   a second frame member adapted for use in the vehicle body;
   wherein each said frame member is adapted to extend radially to a longitudinal axis of said body and is adapted to associate with structural elements of said body parallel to said longitudinal axis of said body, each said frame member comprising:
      a plurality of flat strips; and
      at least one notch;
   wherein at least one of said structural elements is adapted for insertion in said respective frame member by means of said at least one notch; and
   wherein said plurality of flat strips of said first frame member are formed as a first ring;
   wherein said plurality of flat strips of said second frame member are formed as a second ring; and
   wherein said first ring is disposed in parallel with and longitudinally spaced behind said second ring.

8. The vehicle body frame according to claim 7, further comprising linking flats disposed perpendicularly between said flat strips constituting said first and second rings.

9. A segment of a vehicle body structure, comprising:
   at least one frame member adapted for use in a vehicle body;
   wherein said at least one frame member is adapted to extend radially to a longitudinal axis of said body and is adapted to associate with structural elements of said body arranged parallel to said longitudinal axis of said body, said at least one frame member comprising:
      a plurality of flat strips lying in a single plane and forming a portion of a ring; and
      at least one notch;
   wherein at least one of said structural elements is adapted for insertion in said at least one frame member by means of said at least one notch; and
   at least another frame member adapted for use in the vehicle body;
   wherein said at least another frame member is adapted to extend radially to a longitudinal axis of said body and is adapted to associate with said structural elements of said body arranged parallel to said longitudinal axis of said body, said at least another frame member comprising:
      a plurality of flat strips lying in a single plane and forming a complete ring; and
      at least one notch;
   wherein at least one of said structural elements is adapted for insertion in said at least another frame member by means of said at least one notch.

10. The vehicle body according to claim 9, including at least one notch in said frame member for receiving one of said longitudinal section members.

11. The frame member according to claim 1, in which said flat strips lie in a plane that is radial to said longitudinal axis of said body.

12. A vehicle body comprising:
at least one vehicle body structure segment, including:
  at least one frame member adapted for use in a vehicle body;
  wherein said at least one frame member is adapted to extend radially to a longitudinal axis of said body and is adapted to associate with structural elements of said body arranged parallel to said longitudinal axis of said body, said at least one frame member comprising:
  a plurality of flat strips lying in a single plane and forming a portion of a ring; and
  at least one notch;
  wherein at least one of said structural elements is adapted for insertion in said at least one frame member by means of said at least one notch; and
at least another frame member adapted for use in the vehicle body;
  wherein said at least another frame member is adapted to extend radially to a longitudinal axis of said body and is adapted to associate with said structural elements of said body arranged parallel to said longitudinal axis of said body, said at least another frame member comprising:
  a plurality of flat strips lying in a single plane and forming a complete ring; and
  at least one notch;
  wherein at least one of said structural elements is adapted for insertion in said at least another frame member by means of said at least one notch; and
  at least two load-carrying longitudinal section members disposed on said vehicle body structure segment, which are fitted parallel to said longitudinal axis of said vehicle body.

13. A vehicle body according to claim 12, further comprising a covering metal sheet which is fitted on said body.

14. A vehicle body structural frame for mounting vehicle body panels, comprising:
  a first frame member having a plurality of flat strips that formed a first ring defining a first outer perimeter of said vehicle body; and
  a second frame member having a plurality of flat strips that formed a second ring defining a second outer perimeter of said vehicle body;
  structural elements extending parallel to a longitudinal axis of said vehicle body and secured to said first frame and second frame;
  wherein said flat strips of said first ring and said second ring lie in respective planes perpendicular to the longitudinal axis of the vehicle body; and
  wherein said first frame, said second frame and said structural elements form a rigid integral support prior to mounting the vehicle body panels.

* * * * *